United States Patent
Tasaka et al.

(10) Patent No.: US 6,280,854 B1
(45) Date of Patent: Aug. 28, 2001

(54) POLYMER ELECTRODE

(75) Inventors: Yoshiyuki Tasaka; Katsuhiro Hashitsume; Katsuaki Kobayashi; Kazumasa Kasagi, all of Yokohama (JP)

(73) Assignee: Mitsubishi Heavy Industries, Ltd., Tokyo (JP)

(*) Notice: Subject to any disclaimer, the term of this patent is extended or adjusted under 35 U.S.C. 154(b) by 0 days.

(21) Appl. No.: 09/389,166

(22) Filed: Sep. 2, 1999

(30) Foreign Application Priority Data

Oct. 15, 1998 (JP) .................................. 10-293475

(51) Int. Cl.$^7$ .................................................. H01M 4/02
(52) U.S. Cl. ......................... 428/500; 429/212; 429/213; 429/217
(58) Field of Search ..................... 428/195, 500; 205/413, 414, 431; 429/212, 213, 217

(56) References Cited

U.S. PATENT DOCUMENTS 5,589,297 * 12/1996 Koga et al. ........................ 429/212

FOREIGN PATENT DOCUMENTS 0911893   4/1999  (EP) .
55-161375  12/1980 (JP) .
487258    3/1992  (JP) .

OTHER PUBLICATIONS

Hiroshi Yoneyama et al. "Charge–discharge Characteristics of Polypyrrole Films Containing Incorporated Anthraquinone–1–Sulfornate" J. Electrochem. Soc., vol. 139, No. 1, pp. 28 to 32, Jan. 1992.

Patent Abstracts of Japan (1989) 13(381): Abstract No. E–810, Corresponding to Japanese Patent Application No. 01 132045, published, May 24, 1989.

E.S. Matveeva, "Could the Acid Dropping of Polyaniline represent the charge transfer interaction?" *Synthetic Metals*, 83:89–96, 1996 no month.

Shin Moteki and Andrew G. Sykes, "Synthetic and Electrochemical studies of anthraquinone–substituted poly(pyrrole) films," *Journal of Electroanalytical Chemistry and Interfacial Electrochemistry*, 447:91–95, 1988 no month.

* cited by examiner

Primary Examiner—Deborah Jones
Assistant Examiner—Bryant Young
(74) Attorney, Agent, or Firm—John P. White; Cooper & Dunham LLP

(57) ABSTRACT

The polymer electrode has a high energy density which is required in a secondary battery having a large charge capability. The polymer electrode includes an electrode composite material containing an active material containing at least three components of polyaniline, polypyrrole and a quinone compound, a conducting agent and a binder, and a collecting body in which the electrode composite material is carried.

16 Claims, 1 Drawing Sheet

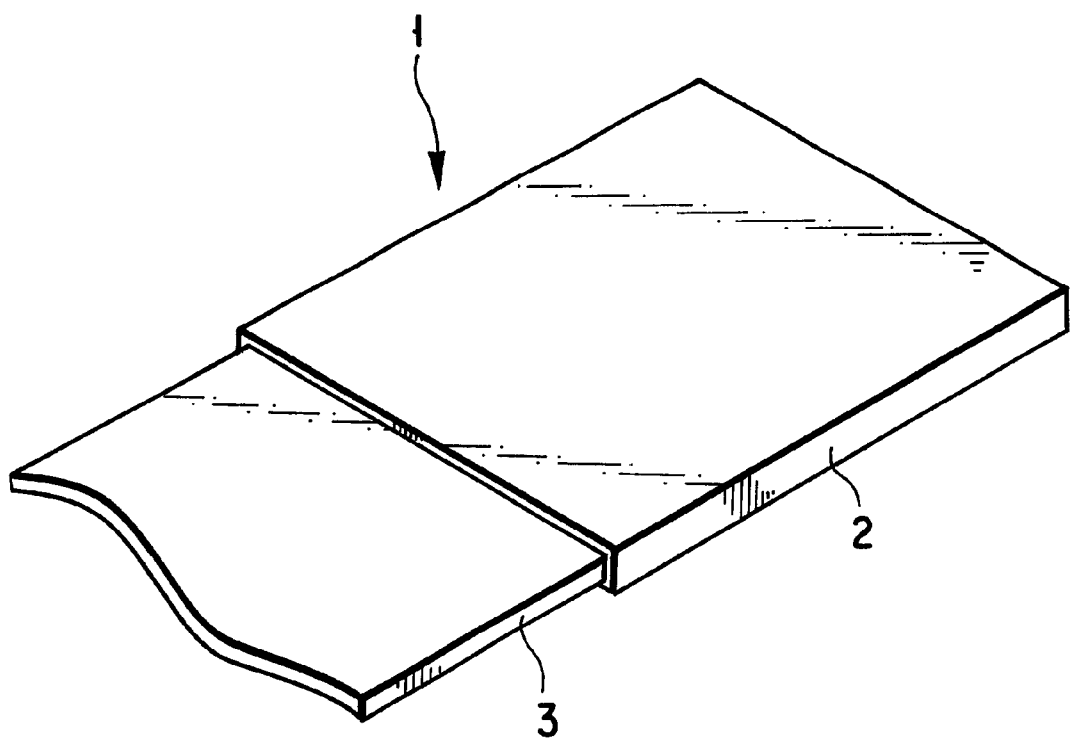
FIGURE

POLYMER ELECTRODE

BACKGROUND OF THE INVENTION

The present invention relates to a polymer electrode used for, for example, a battery, a capacitor, an electronic device, or an electrochromic element.

Electroconducting polymers have electron conductivities and exhibit reversible reduction-oxidation reactions, and therefore the application of the polymers not only to conductive materials but also to the electrodes of secondary batteries is being studied. Especially, in the field of the secondary battery, there is a strong demand of achieving a high energy density, and therefore there have been attempt is that light-weight conducting polymers are used as active materials.

Polyaniline, which is one type of the conducting polymers, has a high stability and has excellent characteristics as an electrode active material, and therefore it has been produced as a coin-type secondary battery in commercial market. However, in the case where polyaniline is used as an electrode active material, the utility thereof is still limited to small-sized secondary batteries such as of a coin type. This is because, if polyaniline is used as the electrode active substance of a secondary battery, it is required to have an electrolyte containing anion in chemical equivalent amount at least to the battery capacitance during a charge or discharge reaction, or the volume energy density becomes low since the polymer is high in size, or the like.

In the meantime, quinone compounds such as benzoquinone, naphthoquinone and anthraquinone each exhibit a reversible reduction-oxidation reaction, and therefore each of them can be utilized as the active material of a secondary battery. Jpn. Pat. Appln. KOKAI Publications No. 55-161375 and No. 4-87258 disclose that quinone compounds are utilized as active materials of secondary batteries.

It can be expected that a quinone compound has a high capacity density due to its chemical structure; however the quinone compound itself does not have a conductivity. Therefore, in order to impart a battery capacity, it is essential that the compound should be combined with an appropriate conducting agent to make a composite. Or a quinone compound having a low molecular weight is dissolved into the liquid of an electrolyte, and therefore the cycle stability is deteriorated.

In J. Electrochem. Soc., Vol. 139, No. 1, pages 28 to 32, 1992, it is reported that a conducting polymer and a quinone compound are combined together into a composite so as to induce a synergistic effect. This document discloses that polypyrrole, which is one type of the conducting polymers, and anthraquinone sulfonic acid, which is one type of the quinone compounds, are combined together to form a composite, and such a composite will have a battery capacitor of 2 times as much or more than the case of polypyrrole formed by making electrically and chemically inactive naphthalene sulfonic acid into a composite. In this document, a thin film-like polypyrrole which is polymerized by electrolysis on 1 $cm^2$ of an area of the electrode, and the capacity density is reported to be 118 Ah/kg (the value of the energy density is not mentioned).

There are mainly two methods for preparing a conducting polymer, that is, the chemical polymerization method and the electrolytic polymerization method. The electrolytic polymerization method has an advantage that a conducting polymer can be polymerized in a film-like manner, directly on the surface of a collecting body. However, with this method, it is difficult to uniformly synthesize an electrode of a large area. On the other hand, a conducting polymer obtained by the chemical polymerization method is generally in the form of powder, and therefore, in order to make an electrode, it is necessary to provide a step of preparing a slurry obtained by adding an electroconducting agent, a binder and the like to the electroconducting polymer, and applying the slurry onto a collecting body. In contrast, the chemical polymerization method has an advantage of being able to manufacture a large-area electrode easily.

A secondary battery having a large battery capacitance inevitably has a large electrode area, and therefore it is necessary to have an electrode of a large area.

BRIEF SUMMARY OF THE INVENTION

The object of the present invention is to provide a polymer electrode having a high energy density, which is required in a secondary battery having a large battery capacitance.

According to the present invention, there is provided a polymer electrode including:

an electrode composite material containing an active material containing at least three components of polyaniline, polypyrrole and a quinone compound, a conducting agent and a binder; and a collecting body in which the electrode composite material is carried.

According to another present invention, there is provided a polymer electrode including:

an electrode composite material containing an active material containing at least three components of polyaniline, polypyrrole and a quinone compound, and a dopant-removed polyaniline used as a binder which also serves as a conducting agent; and a collecting body in which the electrode composite material is carried.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

The single FIGURE is partially cut-out perspective view showing a polymer electrode according to the present invention.

DETAILED DESCRIPTION OF THE INVENTION

The polymer electrode of the present invention will now be described in detail.

As can be seen in FIGURE, a polymer electrode 1 has a structure in which an electrode composite material 2 is carried on a collecting body 3. The electrode composite material 2 contains an active material including at least three components, that is, polyaniline, polypyrrole and a quinone compound, a conducting agent and a binder, or the at least three components and a dopant-removed polyaniline used as a binder which also serves as a conducting agent.

Polyaniline, which is the first component of the active material, can be prepared by the known chemical polymerization or electrolytic polymerization method. The synthesis of polyaniline by the ordinary chemical polymerization method is carried out in the following manner. That is, monomer aniline is dissolved into an acidic aqueous solution of hydrochloric acid, sulfuric acid, perchloric acid or the like, and an oxidizer such as ammonium persulfate is added drop by drop to the solution. Here, there is a tendency that as the polymerization temperature is lower, the molecular weight of polyaniline becomes higher, and the polymerization is carried out for several hours to several days at a temperature with which the polymerization solution is not frozen. In order to obtain polyaniline of a high molecular weight, the method where the polymerization is carried out in a mixture solvent of water and an organic solvent which is not frozen at a temperature of 0° C. or lower, or the method where the polymerization is carried out in an emulsion solvent of an organic solvent and water, with use of a surfactant as a dopant, is known.

Polyaniline obtained by the chemical polymerization has a protonated emeraldine structure which has been doped with anion contained in a polymerization solution, and it is electrochemically active. When such an anion-doped polyaniline is immersed in an alkali aqueous solution such as ammonium water, the anion, which is the dopant, is removed, and polyaniline is transformed to have an emeraldine basic structure. It is known that a dopant-removed polyanlline becomes soluble to an organic solvent such as N-methyl-2-pyrrolidone (NMP). The dopant-removed polyaniline is electrochemically inactive; however when it is immersed into an acidic aqueous solution, it is doped with anion contained in the acidic aqueous solution, and it is transformed back to electro-chemically active polyaniline.

When a quinone compound is used as an anion during the re-doping of once-dopant-removed polyaniline, it is easy to obtain a quinone compound-doped polyaniline, which is a composite of a quinone compound and polyaniline.

Polypyrrole, which is the second component of the active material, can be prepared by the known chemical polymerization or electrolytic polymerization method. The synthesis of polypyrrole by the chemical polymerization method is carried out in the following manner. That is, monomer pyrrole is dissolved into an acidic aqueous solution such as of dodecylbenzene sulfonic acid, and an oxidizer such as ammonium persulfate is added drop by drop to the solution. As in the case of polyaniline described above, the polymerization is carried out for several hours to several days at a temperature with which the polymerization solution is not frozen.

Polypyrrole obtained thus by the chemical polymerization has been doped with the anion contained in the polymerization solution, and is electro-chemically active.

The quinone compound, which is the third component of the active material, exhibits a charging capability as the conjugated quinone structure in its molecule is reversibly reduced or oxidized, and further serves as the dopant for polyaniline due to the sulfonic acid group in the molecule.

Specific examples of the quinone compound are parabenzoquinone sulfonic acid, parabenzoquinone disulfonic acid, orthobenzoquinone sulfonic acid, orthobenzoequinone disulfonic acid, naphthoquinone sulfonic acid, naphthoquinone disulfonic acid, anthraquinone sulfonic acid, anthraquinone disulfonic acid, phenanthoquinone sulfonic acid, triphenylenetriquinone sulfonic acid, pyrenequinone sulfonic acid, sulfonic acid, biphenyldiquinone sulfonic acid, terphenyltriquinone sulfonic acid and tetraphenyltetraquinone sulfonic acid.

A hydroxyl group-containing compound, which transforms into a conjugated quinone structure when electrochemically oxidized, is also included in the quinone compounds which can be used in the present invention. This is because a compound containing hydroxyl groups at the para- and ortho-positions of the condensation polycyclic compound, transforms into a carbonyl group, that is, a conjugated quinone structure, when electrochemically oxidized, and therefore such a compound can be regarded as a conjugated quinone structure. Specific examples of such a quinone compound are 2,5-dihydroxybenzene sulfonic acid, 2,5-dihydroxy-1,4-benzene disulfonic acid, 2,3-dihydroxybenzene sulfonic acid, 2,3-dihydroxynaphthalene-6-sulfonic acid, alizarine-5-sulfonic acid, alizarine lead S, 1,2,5,8-tetrahydroxyanthraquinone sulfonic acid, 1,4-dihydroxyanthraquinone sulfonic acid, 1,4-dihydroxynaphthoquinoen sulfonic acid, monosulfonated ellagic acid, gallein sulfonic acid, 2,3,6,7,10,11-hexahydroxytriphenylene sulfonic acid.

The active material should preferably be made of a mixture obtained by mixing polyaniline powder doped especially with a quinone compound described above (that is, a quinone compound-polyaniline composite material) and polypyrrole compound together.

The mixture ratio of the quinone compound with respect to polyaniline (in terms of weight) depends upon the molecular weight of the quinone compound or the number of sulfonic acid groups contained therein; however it is preferable that it should be set to a ratio close to a full dope composition with respect to polyaniline. The full dope composition of polyaniline generally indicates a state in which 2 anions are doped with respect to 4 units of the aniline structure in a polyaniline molecule. When the ratio of the quinone compound mixed to polyaniline is less than the full dope composition, polyaniline must carry out a charge or discharge by utilizing anions contained in the electrolyte, and therefore an electrolytic solution containing such an amount of anions, which corresponds to the charge capacity, is necessary. Therefore, in the case where the energy density of the battery as a whole decreases, or a sufficient electrolyte is not present, the capacity of polyaniline cannot be brought out, and therefore the performance of the battery is deteriorated. Further, the advantage that the charge capacity is increased by doping the quinone compound, is lost. Reversely, when the ratio of the quinone compound mixed to polyaniline is more than the full dope composition, the ratio of those quinone compounds which are not doped to polyaniline, that is, not ionic-bonded, out of all the mixed quinone compounds, becomes large. As a result, those quinone compounds which are not bonded to polyaniline gradually drop out of the electrode, thus deteriorating the cycle stability of the battery.

The optical mixture ratio between the polyaniline powder doped with the quinone compound (quinone compound-polyaniline composite), and the polypyrrole powder, depends upon the type of the quinone compound employed; however it is preferable that the composite material should have a ratio of 50 to 90% by weight, and polypyrrole should have a ratio of 10 to 50% by weight.

If the mixture ratio of polypyrrole is set to less than 10% by weight, the charge capacity of the quinone compound cannot be brought out, and therefore the performance of the product may be deteriorated. On the other hand, if the mixture ratio of polypyrrole exceeds 50% by weight, the charge capacity of the entire active material becomes low even if the charge capacity of the quinone compound can be brought out, and therefore the performance of the product may also be deteriorated.

It is preferable that the active material should be mixed at a ratio of 50% by weight or higher, more preferably 70% by weight or higher, with respect to the total amount of the electrode composition material. If the mixture ratio of the active material is set to less than 50% by weight, the charge capacity decreases and therefore the energy density may be lowered. It should be noted that the upper limit value of the mixture ratio of the active material with respect to the total amount of the electrode composition material should preferably be set to 90% by weight.

As the conducting agent in the electrode composition material, for example, acetylene black or carbon fiber can be used. These conducting agents have an effect of improving the electron conductivity in the electrode composition material. If the mixture ratio of the conducting agent to the electrode composition material is excessive, the charge capacity of the entire electrode composition material decreases. Therefore, the mixture ratio to the total amount of the electrode composition material should preferably be set to 45% by weight or less, or more preferably 5 to 20% by weight.

As the binder in the electrode composition material, for example, vinylidene polyfluoride or polytetrafluoroethylene can be used. These binders have an effect of binding the powder materials of the electrode composition material together and obtaining a film-like polymer electrode having a high mechanical strength. Generally, it is preferable that the binder should be mixed at a ratio in a range of 5 to 45% by weight with respect to the total amount of the electrode composition material. If the mixture ratio of the binder is less than 5% by weight, the binding between the powder materials of the electrode composition material becomes weak, and therefore it is difficult to form a film-like polymer electrode. On the other hand, if the mixture ratio of the binder exceeds 45% by weight, the charge capacity of the powder materials as a whole decreases, and the resistance of the electrode increases. Generally, the mixture amount of the binder becomes less, the charge capacity of the electrode increases. Therefore, it is preferable that the mixture amount of the binder should be set as small as possible, in order to obtain the best possible performance of the electrode.

It should be noted that the dopant-removed polyaniline can be used as a binder which also serves as a conducting agent. With use of such a dopant-removed polyaniline also having a function of a conducting agent, as the binder, it becomes possible to prepare all the electrode composite materials with active materials, except for the collecting body. In the electrode composition material contained the dopant-removed polyaniline, it is preferable that the active material should have a ratio of 70 to 95% by weight, and the dopant-removed polyaniline should have a ratio of 5 to 30% by weight.

As the collecting body, which serves as a supporter for the electrode composition material, for example, a carbon or metal material is used. In addition to the carbon fiber textile, porous carbon, graphite plate, carbon paper, carbon felt, carbon film or the like can be used, as the carbon-based collecting body. As the metal-based collecting body, foil, metal wire, texture or the like, which is made of, for example, stainless steel or aluminum can be used.

The polymer electrode of the present invention can be manufactured, for example, in the following method.

An electrode composition material consisting of an active material containing at least three components, polyaniline, polypyrrole and a quinone compound, preferable active material containing polypyrrole powder and polyaniline power doped with a quinone compound, a conducting agent and a binder, is integrally formed with a collecting body, thus manufacturing a polymer electrode. It is allowed that a dopant-removed polyaniline is used as a binder which also serves as a conducting agent.

In the manufacture of the polymer electrode, it is preferable that the following method should be employed in order to increase its area. First, the electrode composition material is dispersed within an appropriate solvent such as N-methyl-2-pyrrolidone (NMP), thus preparing a electrode composition material slurry. Then, the slurry is impregnated into or applied onto the collecting body, and the solvent is removed. After that, the electrode composition material on the surface of the collecting body is pressed with a roll press device or the like, thus obtaining a polymer electrode.

As described above, according to the present invention, the electrode composition material which contains an active material obtained by adding a high-capacity quinone compound and polypyrrole to a high-stability polyaniline, a conducting agent and a binder, is integrally formed with a collecting body, and thus a polymer electrode having a high energy density can be obtained.

According to another present invention, the electrode composition material which contains an active material obtained by adding a high-capacity quinone compound and polypyrrole to a high-stability polyaniline, and a dopant-removed polyaniline used as a binder which also serves as a conducting agent, is integrally formed with a collecting body, and thus a polymer electrode having a high energy density can be obtained.

In particular, with use of the active material which is a composite material obtained by doping a high-capacity quinone compound to high-stability polyaniline, and further provided with the third component, polypyrrole (preferably, the active material containing the composite material at 50 to 90% by weight and polypyrrole at 10 to 50% by weight), a polymer electrode having a higher energy density can be obtained.

Further, with use of a quinone compound containing al least one sulfonic acid group and at least two hydroxyl groups, or having at least one pair of conjugated quinone structures, it becomes possible to obtain an electrode which can exhibit reversible oxidation or reduction reaction while maintaining a high capacity of the active material. Therefore, when the polymer electrode is built in a secondary battery, an excellent charge-up capability can be achieved.

Preferred examples of the present invention will now be described in detail.

Example 1

287 g of water, 11 g of 97%-sulfuric acid and 19 g of aniline were put in a flask having a volume of 500 mL, and while maintaining the temperature at about 1° C., an aqueous solution obtained by dissolving 57 g of ammonium persulfate into 86 g of water was added drop by drop. At a temperature of about 1° C., the mixture was stirred for about a day, thus finishing the polymerization. The polymerization solution was filtrated with a glass filter, so as to separate the polymerized material. Thus separated polymerized material was washed with water and then dried, thus obtaining polyaniline powder.

The synthesized polyaniline was immersed in an alkali aqueous solution for about a day so as to removed the dopant therefrom. The alkali aqueous solution used here had a concentration excessive (two times as much as the equivalency or higher) to the amount of sulfuric acid ion contained in the solution, which was calculated on an assumption that polyaniline had a full dope composition. The alkali treatment solution was filtrated with a glass filter so as to separate polyaniline, and the separated polyaniline was washed with water until the cleaning liquid became neutral, followed by drying. Thus, polyaniline from which the dopant, sulfuric acid ion, had been removed, was obtained. Hereinafter, this polyaniline will be called "dopant-removed polyaniline".

Commercially available hydroquinone potassium sulfonate was dissolved into water, and the aqueous solution was allowed to pass a positive ion-exchange resin filled column, so as to remove potassium, and thus a hydroquinone sulfonic acid aqueous solution was obtained. The concentration of the hydroquinone sulfonic acid aqueous solution was obtained by titration using a sodium hydroxide aqueous solution whose concentration is already known.

The synthesized dopant-removed polyaniline was dispersed in the synthesized hydroquinone sulfonic acid aqueous solution such that 2 moles of hydroquinone sulfonic acid are equivalent in ratio to 4 moles of aniline unit structures of the dopant-removed polyaniline. In the case of hydroquinone sulfonic acid, the full dope composition is 49% by weight of polyaniline and 51% by weight of hydroquinone sulfonic acid. The dispersive was subjected to an evaporator so as to remove water of the solvent, and polyaniline doped with hydroquinone sulfonic acid was obtained. Hereinafter, this polyaniline will be called "quinone-doped polyaniline".

500 g of water, 49 g of dodecylbenzene sulfonic acid and 24 g of pyrrole were put in a flask having a volume of 1 L, and while maintaining the temperature at about 1° C., an aqueous solution obtained by dissolving 14 g of ammonium persulfate into 100 g of water was added drop by drop. At a temperature of about 1° C., the mixture was stirred for about two days, thus finishing the polymerization. The polymerization solution was poured into 2 L of methanol, so as to precipitate the polymerized material, which was further filtrated with a glass filter, so as to separate the polymerized material. Thus separated polymerized material was washed with water and then dried, thus obtaining polypyrrole powder.

To a mixture of 0.0565 g of quinone-doped polyaniline powder, 0.071 g of polypyrrole powder, and 0.0071 g of dopant-removed polyaniline powder functioning as a conducting agent as well as a binder, obtained as above, 0.59 g of N-methyl-2-pyrrolidone (NMP) solvent was added to prepare an electrode composition material slurry. The slurry was then impregnated to a collecting body made of a carbon fiber texture having an area of 7.07 cm². Subsequently, the collecting body was put in a drier, and dried under normal pressures at 80° C. for 2 hours. After that, it was further dried under a reduced pressure of about 1 mmHg at 80° C. for 6 hours, thus obtaining a film-like polymer electrode.

Example 2

To a mixture of 0.0495 g of quinone-doped polyaniline powder, 0.0141 g of polypyrrole powder, and 0.0071 g of dopant-removed polyaniline powder functioning as a conducting agent as well as a binder, which were obtained in the same manner as that of Example 1, 0.59 g of NMP solvent was added to prepare an electrode composition material slurry. The slurry was then impregnated to a collecting body made of a carbon fiber texture having an area of 7.07 cm². Subsequently, the collecting body was put in a drier, and dried under normal pressures at 80° C. for 2 hours. After that, it was further dried under a reduced pressure of about 1 mmHg at 80° C. for 6 hours, thus obtaining a film-like polymer electrode.

Example 3

To a mixture of 0.0424 g of quinone-doped polyaniline powder, 0.0212 g of polypyrrole powder, and 0.0071 g of dopant-removed polyaniline powder functioning as a conducting agent as well as a binder, which were synthesized in the same manner as that of Example 1, 0.59 g of NMP solvent was added to prepare an electrode composition material slurry. The slurry was then impregnated to a collecting body made of a carbon fiber texture having an area of 7.07 cm². Subsequently, the collecting body was put in a drier, and dried under normal pressures at 80° C. for 2 hours. After that, it was further dried under a reduced pressure of about 1 mmHg at 80° C. for 6 hours, thus obtaining a film-like polymer electrode.

Example 4

To a mixture of 0.0353 g of quinone-doped polyaniline powder, 0.0283 g of polypyrrole powder, and 0.0071 g of dopant-removed polyaniline powder functioning as a conducting agent as well as a binder, which were synthesized in the same manner as that of Example 1, 0.59 g of NMP solvent was added to prepare an electrode composition material slurry. The slurry was then impregnated to a collecting body made of a carbon fiber texture having an area of 7.07 cm². Subsequently, the collecting body was put in a drier, and dried under normal pressures at 80° C. for 2 hours. After that, it was further dried under a reduced pressure of about 1 mmHg at 80° C. for 6 hours, thus obtaining a film-like polymer electrode.

Example 5

To a mixture of 0.0283 g of quinone-doped polyaniline powder, 0.0353 g of polypyrrole powder, and 0.0071 g of dopant-removed polyaniline powder functioning as a conducting agent as well as a binder, which were synthesized in the same manner as that of Example 1, 0.59 g of NMP solvent was added to prepare an electrode composition material slurry. The slurry was then impregnated to a collecting body made of a carbon fiber texture having an area of 7.07 cm². Subsequently, the collecting body was put in a drier, and dried under normal pressures at 80° C. for 2 hours. After that, it was further dried under a reduced pressure of about 1 mmHg at 80° C. for 6 hours, thus obtaining a film-like polymer electrode.

Example 6

0.644 g of vinylidene polyphosphate which is a binder was dissolved into 13.0 g of dimethylacetoamide (to be abbreviated as DMAc hereinafter) solvent. To the solution, 4.637 g of quinone-doped polyaniline powder, 0.515 g of polypyrrole powder, which were synthesized in the same manner as that of Example 1, and 0.644 g of acetylene black functioning as a conducting agent were added to prepare an electrode composition material slurry. The slurry was then applied on both surfaces of an aluminum foil of a rectangular shape of 10 cm×20 cm. Subsequently, the resultant was put in a drier, and dried under normal pressures at 80° C. for 2 hours. After that, it was further dried under a reduced pressure of about 1 mmHg at 80° C. for 6 hours, so as to remove the solvent. After dried, the resultant was passed through a roll-press machine, where it was pressed with a load of about 1000 kgf, thus obtaining a flat polymer electrode having a thickness of about 0.4 mm.

Example 7

0.644 g of vinylidene polyphosphate which is a binder was dissolved into 13.0 g of DMAc solvent. To the solution, 4.122 g of quinone-doped polyaniline powder, 1.030 g of polypyrrole powder, which were synthesized in the same manner as that of Example 1, and 0.644 g of acetylene black functioning as a conducting agent were added to prepare an electrode composition material slurry. The slurry was then applied on both surfaces of an aluminum foil of a rectangular shape of 10 cm×20 cm. Subsequently, the resultant was put in a drier, and dried under normal pressures at 80° C. for 2 hours. After that, it was further dried under a reduced pressure of about 1 mmHg at 80° C. for 6 hours, so as to remove the solvent. After dried, the resultant was passed through a roll-press machine, where it was pressed with a load of about 1000 kgf, thus obtaining a flat polymer electrode having a thickness of about 0.4 mm.

Example 8

0.644 g of vinylidene polyphosphate which is a binder was dissolved into 13.0 g of DMAc solvent. To the solution, 3.606 g of quinone-doped polyaniline powder, 1.546 g of polypyrrole powder, which were synthesized in the same manner as that of Example 1, and 0.644 g of acetylene black functioning as a conducting agent were added to prepare an electrode composition material slurry. The slurry was then applied on both surfaces of an aluminum foil of a rectangular shape of 10 cm×20 cm. Subsequently, the resultant was put in a drier, and dried under normal pressures at 80° C. for 2 hours. After that, it was further dried under a reduced pressure of about 1 mmHg at 80° C. for 6 hours, so as to remove the solvent. After dried, the resultant was passed through a roll-press machine, where it was pressed with a load of about 1000 kgf, thus obtaining a flat polymer electrode having a thickness of about 0.4 mm.

Example 9

0.644 g of vinylidene polyphosphate which is a binder was dissolved into 13.0 g of DMAc solvent. To the solution, 3.091 g of quinone-doped polyaniline powder, 2.061 g of polypyrrole powder, which were synthesized in the same manner as that of Example 1, and 0.644 g of acetylene black functioning as a conducting agent were added to prepare an electrode composition material slurry. The slurry was then applied on both surfaces of an aluminum foil of a rectangular shape of 10 cm×20 cm. Subsequently, the resultant was put in a drier, and dried under normal pressures at 80° C. for 2 hours. After that, it was further dried under a reduced pressure of about 1 mmHg at 80° C. for 6 hours, so as to remove the solvent. After dried, the resultant was passed through a roll-press machine, where it was pressed with a load of about 1000 kgf, thus obtaining a flat polymer electrode having a thickness of about 0.4 mm.

Comparative Example 1

In the same manner as that of Example 1, quinone-doped polyaniline powder was synthesized. To a mixture of 0.0636 g of thus obtained quinone-doped polyaniline powder, and 0.0071 g of dopant-removed polyaniline powder functioning as a conducting agent as well as a binder, 0.59 g of NMP solvent was added to prepare an electrode composition material slurry. The slurry was then impregnated to a collecting body made of a carbon fiber texture having an area of 7.07 cm$^2$. Subsequently, the collecting body was put in a drier, and dried under normal pressures at 80° C. for 2 hours. After that, it was further dried under a reduced pressure of about 1 mmHg at 80° C. for 6 hours, thus obtaining a film-like polymer electrode.

Comparative Example 2

In the same manner as that of Example 1, dopant-removed polyaniline powder and polypyrrole were synthesized.

The synthesized dopant-removed polyaniline was dispersed in the benzene sulfonic acid aqueous solution such that 2 moles of benzene sulfonic acid was equivalent in ratio to 4 moles of aniline unit structures of the dopant-removed polyaniline. In the case of benzene sulfonic acid, the full dope composition is 46% by weight of polyaniline and 54% by weight of benzene sulfonic acid. The dispersive was subjected to an evaporator so as to remove water of the solvent, and polyaniline doped with benzene sulfonic acid (non-quinone-doped polyaniline) was obtained.

To a mixture of 0.0495 g of thus obtained polyaniline powder doped with benzene sulfonic acid, 0.0141 g of polypyrrole powder and 0.0071 g of dopant-removed polyaniline powder functioning as a conducting agent as well as a binder, 0.59 g of NMP solvent was added to prepare an electrode composition material slurry. The slurry was then impregnated to a collecting body made of a carbon fiber texture having an area of 7.07 cm$^2$. Subsequently, the collecting body was put in a drier, and dried under normal pressures at 80° C. for 2 hours. After that, it was further dried under a reduced pressure of about 1 mmHg at 80° C. for 6 hours, thus obtaining a film-like polymer electrode.

With use of each one of the polymer electrodes prepared in Examples 1 to 9 and Comparative Examples 1 and 2, as an anode, a lithium metal as a cathode, a lithium perchloric acid / propylene carbonate solution having a concentration of 1 mole/L as an electrolyte solution, and a commercially available porous polypropylene film as a separator, secondary batteries were manufactured.

A charge/discharge test was carried out for the manufactured batteries under the conditions of a current density of 0.1 mA/cm$^2$, an upper limit potential of 4V and a lower limit potential of 2.5V, and thus the charge/discharge capacitance and charge/discharge power of each battery were measured. Thus obtained charge/discharge power was divided by the weight of the active material in the anode so as to calculate an energy density [Wh/kg] per active material. The energy density per active material for each of the electrodes was indicated in TABLE 1 below.

TABLE 1

| | Electrode composition material [% by weight] | | | | | | Energy density per active material [Wh/kg] |
|---|---|---|---|---|---|---|---|
| | Active material | | | Conducting agent also serving as | | | |
| | Quinone-doped aniline | Non-quinone-doped aniline | Poly-pyrrole | binder; dopant-removed polyaniline | Conducting agent; acetylene black | Binder; vinylidene polyfluoride | |
| Example 1 | 80 | 0 | 10 | 10 | 0 | 0 | 304 |
| Example 2 | 70 | 0 | 20 | 10 | 0 | 0 | 314 |
| Example 3 | 60 | 0 | 30 | 10 | 0 | 0 | 331 |
| Example 4 | 50 | 0 | 40 | 10 | 0 | 0 | 315 |
| Example 5 | 40 | 0 | 50 | 10 | 0 | 0 | 286 |
| Example 6 | 72 | 0 | 8 | 0 | 10 | 10 | 293 |
| Example 7 | 64 | 0 | 16 | 0 | 10 | 10 | 311 |
| Example 8 | 56 | 0 | 24 | 0 | 10 | 10 | 332 |
| Example 9 | 48 | 0 | 32 | 0 | 10 | 10 | 316 |
| Comparative Example 1 | 90 | 0 | 0 | 10 | 0 | 0 | 290 |
| Comparative Example 2 | 0 | 70 | 20 | 10 | 0 | 0 | 250 |

As is clear from TABLE 1 above, the performances of the electrodes of Examples 1 to 9, in which polypyrrole was blended, were high as compared to the performance of the electrode of Comparative Example 1 in which polypyrrole was not blended. Thus, the performance of the electrode was improved if polypyrrole was added as the third component.

Further, as compared to the electrode performance of Comparative Example 2, in which benzene sulfonic acid having no charging capability, the performances of the electrodes of Examples 1 to 9 in which the quinone compound was blended, were remarkably high, and therefore it is clear that the quinone compound exhibited a charging capability.

As described with reference to specific examples above, it is clear that the polymer electrodes of the present invention exhibit extremely high performances as the electrodes of the secondary batteries.

Further, by employing the method of impregnating or applying the slurry of the electrode composition material to the collecting body, an electrode of a relatively large area can be easily obtained. Therefore, it becomes possible to provide a secondary battery having a large charge capacitance at low production cost.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A polymer electrode for a secondary battery comprising:
   an electrode composite material containing an active material, a conducting agent and a binder, said active material containing a mixture of a composite material made of polyaniline synthesized by doping a quinone compound thereto, and polypyrrole; and
   a collecting body in which the electrode composite material is carried.

2. A polymer electrode according to claim 1, wherein the quinone compound contains at least one sulfonic acid group and at least two hydroxyl groups.

3. A polymer electrode according to claim 1, wherein the quinone compound contains at least one conjugated quinone structure.

4. A polymer electrode according to claim 1 wherein the mixture consists of 50 to 90% by weight of the composite material and 10 to 50% by weight of polypyrrole.

5. A polymer electrode according to claim 1, wherein the active material is blended at a ratio of 50% by weight or more with respect to a total amount of the electrode composition material.

6. A polymer electrode according to claim 1, wherein the conducting agent is acetylene black or carbon fiber.

7. A polymer electrode according to claim 6, wherein the conducting agent is blended at a ratio of 45% by weight or less with respect to a total amount of the electrode composition material.

8. A polymer electrode according to claim 1, wherein the binder is at least one material selected from the group consisting of vinylidene polyfluoride and polytetrafluoroethylene.

9. A polymer electrode according to claim 8, wherein binder is blended at a ratio of 5 to 45% by weight with respect to a total amount of the electrode composition material.

10. A polymer electrode according to claim 1, wherein the collecting body is a carbon-based collecting body made of a material selected from the group consisting of carbon fiber texture, porous carbon, graphite plate, carbon paper, carbon felt and carbon film, or a metal-based collecting body made of a material selected from the group consisting of foil, net and texture of stainless steel and aluminum.

11. A polymer electrode for a secondary battery comprising:
    an electrode composite material containing an active material, and a dopant-removed polyaniline used as a binder which also serves as a conducting agent, said active material containing a mixture of a composite material made of polyaniline synthesized by doping a quinone compount thereto, and polypyrrole; and
    a collecting body in which the electrode composite material is carried.

12. A polymer electrode according to claim 11, wherein the quinone compound contains at least one sulfonic acid group and at least two hydroxyl groups.

13. A polymer electrode according to claim 11, wherein the quinone compound contains at least one conjugated quinone structure.

14. A polymer electrode according to claim 11, wherein the mixture consists of 50 to 90% by weight of the composite material and 10 to 50% by weight of polypyrrole.

15. A polymer electrode according to claim 11, wherein the active material is blended at a ratio of 70 to 95% by weight with respect to a total amount of the electrode composition material.

16. A polymer electrode according to claim 11, wherein the collecting body is a carbon-based collecting body made of a material selected from the group consisting of carbon fiber texture, porous carbon, graphite plate, carbon paper, carbon felt and carbon film, or a metal-based collecting body made of a material selected from the group consisting of foil, net and texture of stainless steel and aluminum.

* * * * *